US010765969B2

(12) United States Patent
Dyer (10) Patent No.: US 10,765,969 B2
(45) Date of Patent: Sep. 8, 2020

(54) FLUID DEGASSING SYSTEMS (71) Applicant: Hamilton Sundstrand Corporation, Charlotte, NC (US)

(72) Inventor: Gerald P. Dyer, Suffield, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 418 days.

(21) Appl. No.: 15/659,391

(22) Filed: Jul. 25, 2017

(65) Prior Publication Data
US 2019/0030461 A1 Jan. 31, 2019

(51) Int. Cl.
*B01D 19/00* (2006.01)
*B01D 35/30* (2006.01)
*B01D 36/00* (2006.01)
*B01D 63/06* (2006.01)

(52) U.S. Cl.
CPC ..... *B01D 19/0084* (2013.01); *B01D 19/0005* (2013.01); *B01D 19/0031* (2013.01); *B01D 19/0036* (2013.01); *B01D 35/301* (2013.01); *B01D 35/306* (2013.01); *B01D 36/001* (2013.01); *B01D 36/006* (2013.01); *B01D 63/06* (2013.01); *B01D 63/068* (2013.01); *F23K 2900/05082* (2013.01)

(58) Field of Classification Search
CPC ............ B01D 39/0005; B01D 39/0031; B01D 39/0036; B01D 39/0084; B01D 35/301; B01D 35/306; B01D 36/001; B01D 36/006; B01D 63/02; B01D 63/06; B01D 63/068; F23K 2900/05082
USPC ................................ 95/46, 47, 54; 96/8, 155
See application file for complete search history.

(56) References Cited

U.S. PATENT DOCUMENTS

| 4,758,341 | A | * | 7/1988 | Banner .................. B01D 53/22 210/232 |
| 5,938,922 | A | | 8/1999 | Fulk, Jr. et al. |
| 6,315,815 | B1 | | 11/2001 | Spadaccini et al. |
| 7,334,407 | B2 | | 2/2008 | Spadaccini et al. |
| 7,837,764 | B2 | | 11/2010 | Sanford |
| 8,593,107 | B2 | | 11/2013 | Penner et al. |
| 9,566,553 | B2 | | 2/2017 | Theodore et al. |

(Continued)

FOREIGN PATENT DOCUMENTS

EP 1160002 A2 * 12/2001

OTHER PUBLICATIONS

Extended European Search Report, of the European Patent Office, dated Oct. 24, 2018, issued in corresponding European Patent Application No. 18185467.0.

*Primary Examiner* — Frank M Lawrence, Jr.
(74) *Attorney, Agent, or Firm* — Locke Lord LLP; Daniel J. Fiorello; Scott D. Wofsy (57) ABSTRACT

A fluid degassing device includes a first housing, a second housing disposed within the first housing, a first flow circuit defined by the second housing and the first housing between a first flow circuit opening and a second flow circuit opening of the first flow circuit, and a tube bundle of selectively permeable membrane tubes disposed in the first flow circuit between the second housing and first housing. The tube bundle is disposed at least partially around a circumference of the second housing and the first flow circuit is defined between the first flow circuit opening of the first flow circuit and the second flow circuit opening such that fuel flows rotationally around the second housing through the tube bundle.

19 Claims, 4 Drawing Sheets

(56) References Cited

U.S. PATENT DOCUMENTS

| | | |
|---|---|---|
| 9,623,369 B2 | 4/2017 | Bikson et al. |
| 2004/0223872 A1 | 11/2004 | Brian et al. |
| 2016/0296685 A1 | 10/2016 | Wu et al. |

* cited by examiner

FLUID DEGASSING SYSTEMS

BACKGROUND

1. Field

The present disclosure relates to fluid degassing, e.g., fuel degassing systems (e.g., for deoxygenation of fuel).

2. Description of Related Art

Traditionally, deoxygenation units allow fuel to pass over a cylinder bundle of membrane coated hollow tubes, with a vacuum applied to the inside of the tubes. Oxygen molecules pass through the membrane, and the fuel is deoxygenated. Traditional configurations of the tube bundle are inefficient as most of the fuel passes over only the outside of bundle. The hollow tubes located at the center of the bundle do not have fuel passing over them, and as such are inefficient.

Such conventional methods and systems have generally been considered satisfactory for their intended purpose. However, there is still a need in the art for improved degassing systems. The present disclosure provides a solution for this need.

SUMMARY

A fluid degassing device (e.g., for fuel deoxygenation) includes a first housing, a second housing disposed within the first housing, a first flow circuit defined by the second housing and the first housing between a first flow circuit opening and a second flow circuit opening of the first flow circuit, and a tube bundle of selectively permeable membrane tubes disposed in the first flow circuit between the second housing and first housing (e.g., configured to remove oxygen from fuel in the first flow circuit). The tube bundle is disposed at least partially around a circumference of the second housing and the first flow circuit is defined between the first flow circuit opening of the first flow circuit and the second flow circuit opening such that fuel flows rotationally around the second housing through the tube bundle.

The tube bundle is configured to be in fluid communication with a second flow circuit to fluidly communicate with an inner channel of the tubes of the tube bundle, wherein the second flow circuit is partially fluidly isolated from the first flow circuit such that at least one first fluid cannot pass through a wall of one or more tubes, but such that at least one second fluid can pass through the wall of the one or more tubes to remove the first fluid from the second fluid. For example, the tube bundle is configured to be in fluid communication with a second flow circuit to remove oxygen from within the tubes of the tube bundle.

The second housing can include an elongate portion extending from at least one base portion that is configured to mount to the first housing. In certain embodiments, the elongate portion can include a tapered reducing shape.

The tube bundle can be disposed between the elongate portion and the first housing. The tube bundle can be disposed around the entire circumference of the elongate portion of the second housing. The second housing can define a plurality of holes in the elongate portion to allow fuel to flow between the first flow circuit opening and second flow circuit opening through the tube bundle.

The tube bundle can include two rigid ends such that the tubes are adhered together at least at the ends thereof but are open to be vacuumed and/or purged. The rigid ends can be sealed between the second housing and the first housing to prevent fuel from flowing into the vacuum and/or the purge gas circuit. The rigid ends can be formed by adhering the tubes of the tube bundle together at the ends thereof.

The tube bundle can be configured such that the holes of the elongate portion and the second flow circuit opening are between the rigid ends such that the rigid ends do not impede flow between the first flow circuit opening and the second flow circuit opening.

The at least one base portion of the second housing defines a first vacuum and/or purge gas opening in fluid communication with a first rigid end of the tube bundle. In certain embodiments, the second housing can define both the first flow circuit opening and the second flow circuit opening. For example, the first flow circuit opening and the second flow circuit opening can be coaxial.

The elongate portion can define a cylindrical shape with an inner wall to separate the first flow circuit opening and the second flow circuit opening. The inner wall can include a reducing rectangular cross-section to form a tapered shape. Any other suitable shape is contemplated herein.

In certain embodiments, the device can include one or more walls disposed between the second housing and the first housing to cause the flow in the first flow circuit to move radially outward and inward as the flow traverses a circumferential path between the first flow circuit opening and the second flow circuit opening. For example, the one or more walls can define a labyrinth path.

In certain embodiments, there can be two separate first flow circuits defined between the second housing and the first housing such that each first flow circuit only traverses a portion of circumference of the second housing. The second flow circuit opening can be an outlet. The second flow circuit opening can include a plurality of outlets, for example.

In accordance with at least one aspect of this disclosure, a fluid degassing assembly can include a first housing member, a second housing member disposed within the first housing member to define a fluid circuit therethrough that causes flow to travel circumferentially around the second housing, and a selectively permeable membrane tube bundle disposed around the second housing in the first flow circuit and configured to selectively filter one or more predetermined gases from a fluid flowing therethrough.

A fuel degassing arrangement includes a first housing, a second housing positioned at least partially radially of the first housing defining an annular space therebetween, an inlet and an outlet being defined in at least one of the first housing and the second housing configured to cause fluid flowing into the annular space to flow circumferentially through a portion of the annular space before exiting the annular space through the outlet, and a plurality of tubes positioned within the annular space having walls configured to be selectively permeable to at least one gas such that the at least one gas is able to flow through the walls thereby being separated from fluid passing radially through the annular space. At least one of the first housing or the second housing can include a conical wall configured to distribute flow of fluid between the first housing and the second housing more evenly in an axial direction than would be distributed if the conical wall were not present. A circumferential flow of fluid through the annular space can be through a circumferential angle of at least 270 degrees, or any other suitable angle.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
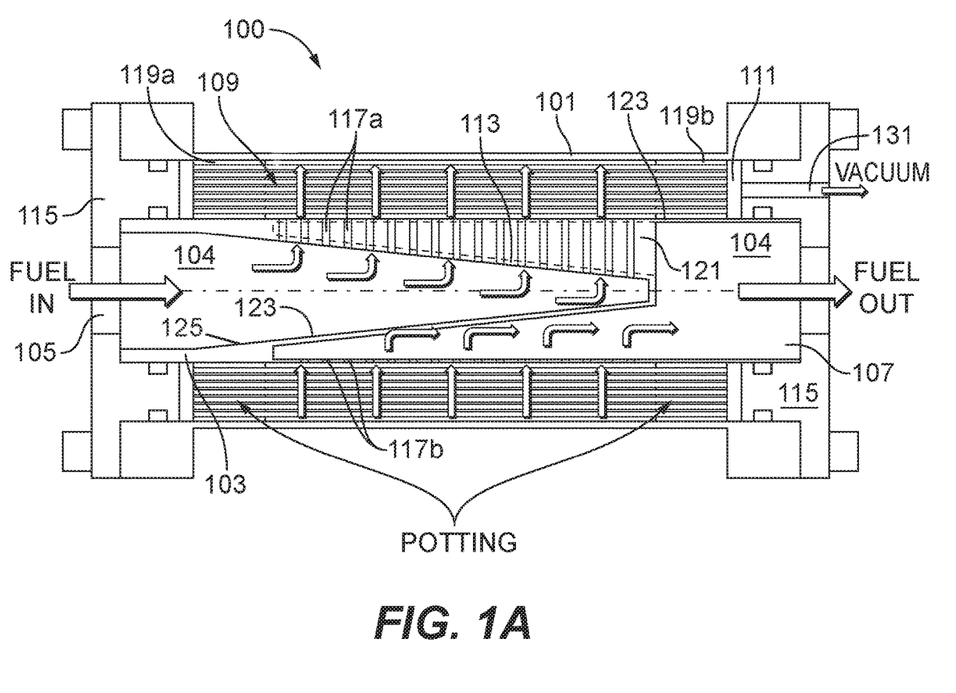
FIG. 1A is a side cross-sectional view of an embodiment of a device in accordance with this disclosure.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1A and is designated generally by reference character 100. Other embodiments and/or aspects of this disclosure are shown in FIGS. 1B-2B. The systems and methods described herein can be used to degas (e.g., deoxygenate) a fluid (e.g., fuel) efficiently.

Figure 1B:
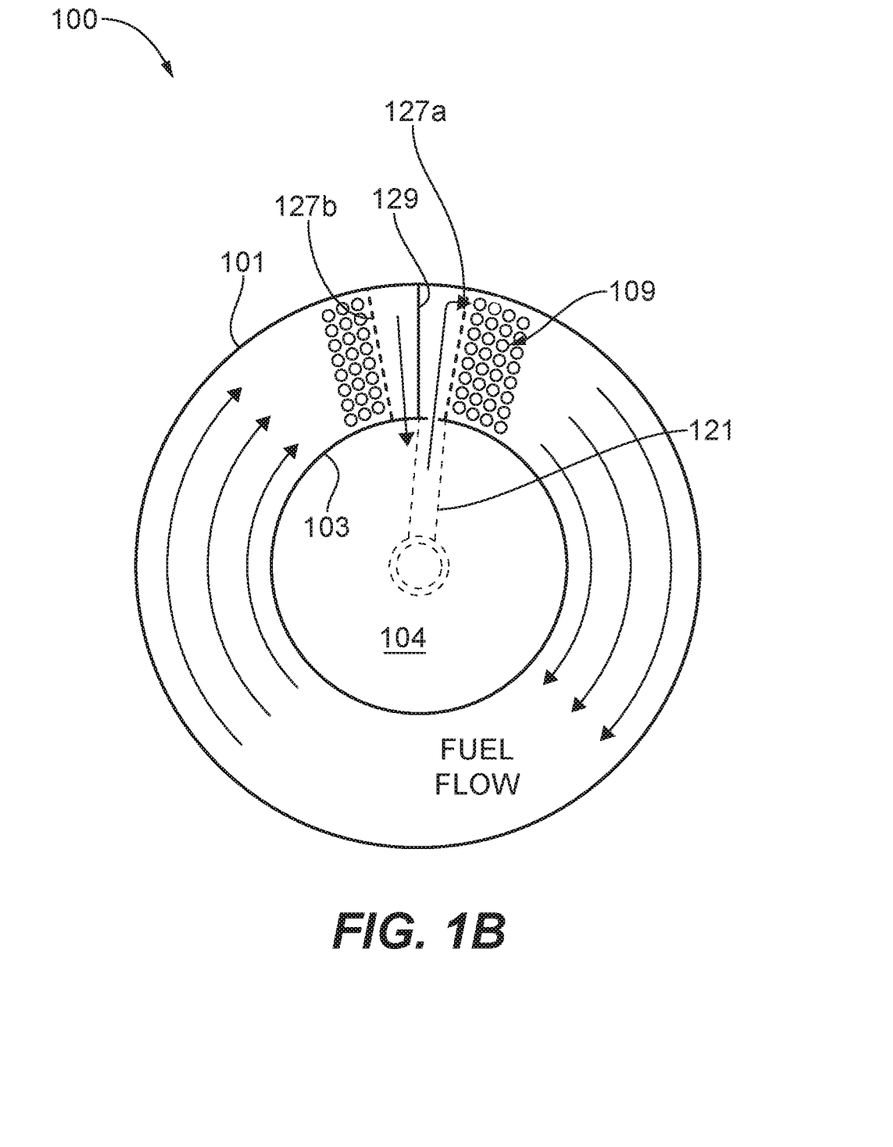
FIG. 1B is a plan cross-sectional view of the embodiment of FIG. 1A, showing the circumferential flow around the second housing.

Referring to FIGS. 1A and 1B, a fluid degassing device 100 includes a first housing 101, a second housing 103 disposed within the first housing 101, and a first flow circuit 104 defined by the second housing 103 and the first housing 101 between a first flow circuit opening 105 and a second flow circuit opening 107 of the first flow circuit 104. A tube bundle 109 of selectively permeable membrane tubes is disposed in the first flow circuit 104 between the second housing 103 and first housing 101 (e.g., configured to remove a gas (e.g., oxygen) from a fluid (e.g., fuel) in the first flow circuit 104. The tube bundle 109 is disposed at least partially around a circumference of the second housing 103 and the first flow circuit 104 is defined between the first flow circuit opening 105 of the first flow circuit and the second flow circuit opening 107 such that fuel flows rotationally around the second housing 103 through the tube bundle 109.

The tube bundle 109 is configured to be in fluid communication with a second flow circuit 111 to fluidly communicate with an inner channel of the tubes of the tube bundle 109. The second flow circuit 111 is partially fluidly isolated from the first flow circuit 104 such that at least one first fluid cannot pass through a wall of one or more tubes, but such that at least one second fluid can pass through the wall of the one or more tubes to remove the first fluid from the second fluid. For example, the tube bundle 109 is configured to be in fluid communication with a vacuum and/or purge gas circuit to remove oxygen from within the tubes of the tube bundle 109.

The second housing 103 can include an elongate portion 113 extending from at least one base portion 115 that can be configured to mount to the first housing 101 (e.g., the base portion 115 can be a cap for example and/or can be formed integrally with the elongate portion 113). In certain embodiments, the elongate portion 113 can include a tapered reducing shape as shown.

The tube bundle 109 can be disposed between the elongate portion 113 and the first housing 101. In certain embodiments, the tube bundle 109 can be disposed around the entire circumference of the elongate portion 113 of the second housing 103. FIG. 1B only shows a portion of schematic tubes for clarity. The second housing 103 can define a plurality of holes 117a, 117b in the elongate portion 113 to allow fuel to flow between the first flow circuit opening 105 and second flow circuit opening 107 through the tube bundle 109.

For example, the elongate portion 113 can define a rib 121 that connects an inner diameter (e.g., a tapered channel) of the elongate portion 113 with an outer diameter thereof. The rib 121 can include holes 117a defined therethrough. The rib 121 can be a thin piece of material or have any other suitable shape and size. One or more other portions of the elongate portion 113 may not include a rib 121, and may have holes 117b which communicates the first flow circuit 104 with the second flow circuit opening 107.

As shown, the elongate portion 113 can define a cylindrical shape 123 and can have an inner wall 125 to separate the first flow circuit opening 105 and the second flow circuit opening 107. The inner wall 125 can include a reducing rectangular cross-section to form a tapered shape, or any other suitable shape. Any other suitable shape is contemplated herein.

Referring to FIG. 1B, a grate 127a can be positioned between the first flow circuit opening 105 and the tube bundle 109. Similarly, a grate 127b can be disposed between the second flow circuit opening 107 and the tube bundle 109. However, it is contemplated that the holes 117a, 117b can be sufficient and no grate 127a, 127b is needed. As shown, a divider wall 129 can extend between the second housing 103 and the first housing 101 that prevents flow from short circuiting directly from the inlet to the outlet such that fuel is forced to flow around the entire circumference of the second housing 103 and through the entirety of the tube bundle 109. The divider wall 129 can be integral with the second housing 103 and/or the first housing 101, or be an insert, or disposed and/or attached in any other suitable manner.

The tube bundle 109 can include two rigid ends 119a, 119b such that the tubes are adhered together at least at the ends thereof but are open to be vacuumed and/or purged. The rigid ends 119a, 119b can be sealed between the second housing 103 and the first housing 101 to prevent fuel from flowing into the vacuum and/or the purge gas circuit 111 (e.g., with any suitable seal such as but not limited to an o-ring on each rigid end 119a, 119b). The rigid ends 119a, 119b can be formed by adhering the tubes of the tube bundle 109 together at the ends thereof (e.g., with epoxy or any other suitable material).

The tube bundle 109 can be configured such that the holes of the elongate portion 113 and the second flow circuit opening 107 are between the rigid ends 119a, 119b such that the rigid ends 119a, 119b do not impede flow between the first flow circuit opening 105 and the second flow circuit opening 107. The at least one base portion 115 of the second housing 103 defines a first vacuum and/or purge gas opening 131 in fluid communication with a rigid end (e.g., end 119b as shown) of the tube bundle 109.

In certain embodiments, the second housing 103 can define both the first flow circuit opening 105 and the second flow circuit opening 107. For example, the first flow circuit opening 105 and the second first flow circuit 107 opening can be coaxial.

Figure 2A:
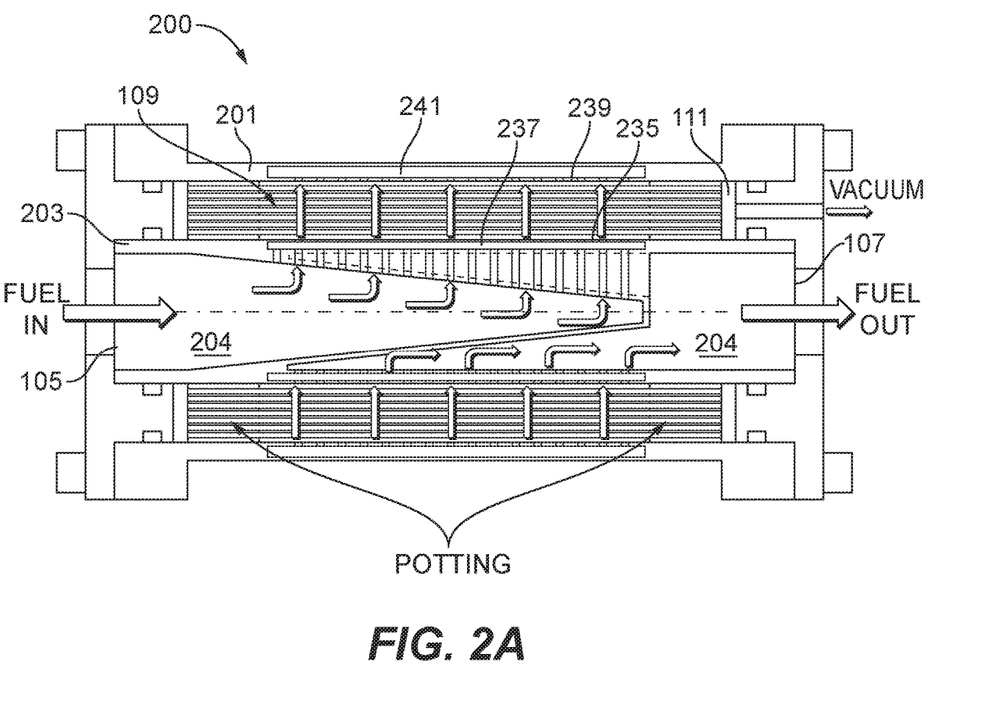
FIG. 2A is a side cross-sectional view of an embodiment of a device in accordance with this disclosure, showing radial and circumferential flow around the second housing.
Figure 2B:
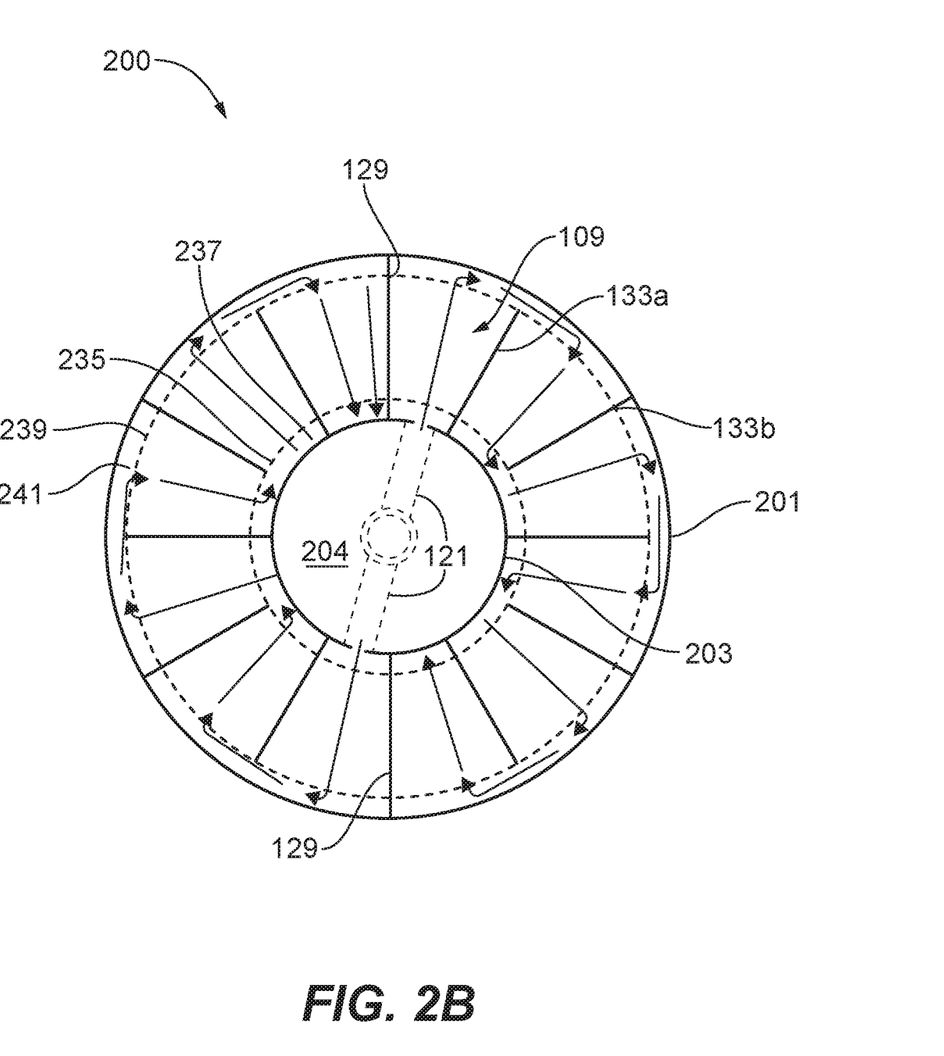
FIG. 2B is a plan cross-sectional view of the embodiment of FIG. 2A.

Referring to FIGS. 2A and 2B, another embodiment of a device 200 is shown. In certain embodiments, the device 200 can include one or more walls 133a, 133b disposed between the second housing 203 and the first housing 201 to cause the flow in the first flow circuit 204 to move radially outward and inward as the flow traverses a circumferential path between the first flow circuit opening 105 and the second flow circuit opening 107. For example, the one or more walls 133a, 133b can define a labyrinth path.

Walls 133a can extend partially across from the second housing 103 and the walls 133b can extend partially across from the first housing 101. Disposing walls 133a, 133b intermittently allows flow to flow outward and inward through the tube bundle 109.

In certain embodiments, the tube bundle 109 can be divided up in any suitable manner in first flow circuit 104 where there are walls 133a, 133b for example. In certain embodiments, as shown in FIGS. 2A and 2B, there can be an inner grate 235 (e.g., defined by one or more holes in the second housing 103) that can overlay one or more inner pass through channels 237 between each wall pair 133a, 133b. Similarly, there can be an outer grate 239 (e.g., defined by one or more holes in the first housing 103) that overlays an outer pass through channel 241 between each wall pair 133a, 133b. In this regard, it is contemplated that tube bundle 109 sections can be placed between the grates 235, 237 such that flow is radial through each tube bundle 109 section.

As shown in FIG. 2B, in certain embodiments, there can be two separate first flow circuits defined between the second housing 103 and the first housing 101 such that each first flow circuit only traverses a portion of circumference of the second housing 103. The multiple first flow circuits can be each have a rib 121 and can be separated with one or more dividing walls 129 or in any other suitable manner for example.

In certain embodiments, the second flow circuit opening 107 can be an outlet. In certain embodiments, there can be a plurality of outlets and/or inlets, one or more for each first flow circuit, for example.

Embodiments, of the first flow circuits 104, 204 can be defined in any suitable manner, e.g., as follows. Referring to FIGS. 1A and 2A, fluid (e.g., fuel) can enter in opening 105, and travel axially through the second housing 103, 203 to the holes 117a. The flow can be reduced to increase speed to cause flow to exit holes 117a more uniformly, for example. The flow can then travel radially outward from the second housing 103, 203. In embodiments as shown in FIGS. 1A and 1B, the flow can then pass over an outside surface of the tubes of the tube bundle as it travels circumferentially around (e.g., as shown in FIG. 1B), while any gas that passes into the inner channel of the tubes (and thus into the second flow circuit) can be drawn out through the second flow circuit (e.g., with vacuum and/or purge gas). In embodiments as shown in FIGS. 2A and 2B, the flow can travel radially outward through each section of tubes, into outer channel 241, where it can travel circumferentially to the next section of tubes, where it can travel radially inward to the inner channel 237, where the flow can travel circumferentially to the next section of tubes, and this can be repeated as many times as there are sections. Ultimately, in both cases, flow can then travel radially inward through the first housing again and into the outlet 107. Flow can be run in reverse in any suitable embodiment. Also, in certain embodiments, the fluid to be degassed (e.g., fuel) can be run through the second flow circuit 111 through the tubes and purge gas/vacuum can be applied to the outer surface of the tubes such that any degassing gasses can be pulled through the first flow circuit 104.

In accordance with at least one aspect of this disclosure, a fluid degassing assembly can include a first housing member, a second housing member disposed within the first housing member to define a fluid circuit therethrough that causes flow to travel circumferentially around the second housing, and a selectively permeable membrane tube bundle disposed around the second housing in the first flow circuit and configured to selectively filter one or more predetermined gases from a fluid flowing therethrough.

In certain embodiments, the device 100, 200 can be a single piece frame that is additively manufactured or made in any other suitable manner such that the second housing 103 and the first housing 101 are integral. The base portions 115 can be end caps for example. However, it is contemplated that the second housing 103 (e.g., including the base portions 115, and/or the elongate portion 113) and the first housing 101 can be formed from any suitable division of pieces and assembled in any suitable manner.

Embodiments include hollow tube membranes potted in place in a cylindrical cavity within the housing. The potting can hold the tubes in place and provides sealing, for example. As shown in FIGS. 1A and 1B, fuel can enter at the left, pass through a conical tube, and passes through a series of holes located in a rib in the conical tube, and can enter a rectangular flow path that runs the length of the housing. Flow can pass radially through a series of holes in the right side of the rectangular passage, and into the cavity containing the hollow tube membranes. Flow can pass through the tube cavity (e.g., in a clockwise direction). As it passes over the tubes, gas (e.g., oxygen) is drawn from the fuel through the membrane and into the center of the hollow tube. A vacuum (or purge gas) is applied to the end of the tube bundle to remove the oxygen from the system. After flowing radially through the hollow tube cavity in the frame, flow can exit into another rectangular passage. Fuel flow can pass through a series of axial spaced holes to the other side of the conical tube. From there, the fuel can exit out of the right side of the unit as shown. Reverse flow is contemplated herein.

In certain embodiments as disclosed above, there can be a plurality (e.g., 12 slots) that include the hollow tube bundles. As shown in FIGS. 2A and 2B, fuel can enter at the left, and pass through a conical tube. Fuel can split into two or more paths (e.g., identical paths). In each path, the flow can pass through a series of holes located in a rib in the conical tube, and enters one of the slots having a hollow tube membrane bundle. Flow can pass radially through the slot, passing over the hollow tube membrane. As it passes over the tubes, gas (e.g., oxygen) is drawn from the fuel through the membrane and into the center of the hollow tubes. A vacuum (or purge gas) can be applied to the end of the tube bundle to remove the oxygen from the system. After flowing radially through one slot, flow can pass circumferentially to the outside of the adjacent slot. Flow can then passes through holes in the housing, and then radially inward through the hollow tubes. It can then pass circumferentially to the next slot, and the flow pattern can be repeated along the plurality of slots. After the last slot, the flow can pass through a series of holes to the other side of the conical tube.

Embodiments as described above include a fuel degassing arrangement that can have a first housing, a second housing positioned at least partially radially of the first housing defining an annular space therebetween, an inlet and an outlet being defined in at least one of the first housing and the second housing configured to cause fluid flowing into the annular space to flow circumferentially through a portion of the annular space before exiting the annular space through the outlet, and a plurality of tubes positioned within the annular space having walls configured to be selectively permeable to at least one gas such that the at least one gas is able to flow through the walls thereby being separated from fluid passing radially through the annular space. At least one of the first housing and the second housing can include a conical wall configured to distribute flow of fluid between the first housing and the second housing more evenly in an axial direction than would be distributed if the conical wall were not present. A circumferential flow of fluid through the annular space can be through a circumferential angle of at least 270 degrees, or any other suitable angle.

Embodiments improve the efficiency of the membrane coated hollow tubes in removing gasses (e.g., oxygen) from the fuel. The fuel can be forced through the tube bundles at a relatively high velocity, to increase the turbulence and efficiency of the oxygen removal through the membrane. In certain embodiments, the fuel makes multiple passes through the tubes to increase the efficiency.

The methods and systems of the present disclosure, as described above and shown in the drawings, provide for fuel degassing systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fluid degassing device, comprising:
   a first housing;
   a second housing disposed within the first housing;
   a first flow circuit defined by the second housing and the first housing between a first flow circuit opening and a second flow circuit opening of the first flow circuit; and
   a tube bundle of selectively permeable membrane tubes disposed in the first flow circuit between the second housing and first housing,
   wherein the tube bundle is disposed at least partially around a circumference of the second housing and the first flow circuit is defined between the first flow circuit opening of the first flow circuit and the second flow circuit opening such that fuel flows rotationally around the second housing through the tube bundle;
   wherein the tube bundle is configured to be in fluid communication with a second flow circuit to fluidly communicate with an inner channel of the tubes of the tube bundle, wherein the second flow circuit is partially fluidly isolated from the first flow circuit such that at least one first fluid cannot pass through a wall of one or more tubes, but such that at least one second fluid can pass through the wall of the one or more tubes to remove the first fluid from the second fluid,
   wherein the second housing includes an elongate portion extending from at least one base portion that is configured to mount to the first housing, wherein the tube bundle is disposed between the elongate portion and the first housing, wherein the tube bundle is disposed around the entire circumference of the elongate portion of the second housing, wherein the elongate portion includes a tapered shape.

2. The device of claim 1, wherein the second housing defines a plurality of holes in the elongate portion to allow fuel to flow between the first flow circuit opening and second flow circuit opening through the tube bundle.

3. The device of claim 2, wherein the tube bundle includes two rigid ends such that the tubes are adhered together at least at the ends thereof but are open to be vacuumed and/or purged.

4. The device of claim 3, wherein the rigid ends are sealed between the second housing and the first housing to prevent fuel from flowing into the vacuum and/or the purge gas circuit.

5. The device of claim 4, wherein the rigid ends are formed by adhering the tubes of the tube bundle together at the ends thereof.

6. The device of claim 4, wherein the tube bundle is configured such that the holes of the elongate portion and the second flow circuit opening are between the rigid ends such that the rigid ends do not impede flow between the first flow circuit opening and the second flow circuit opening.

7. The device of claim 4, the base portion of the second housing defines a first vacuum and/or purge gas opening in fluid communication with a first rigid end of the tube bundle.

8. The device of claim 1, wherein the second housing defines both the first flow circuit opening and the second flow circuit opening.

9. The device of claim 8, wherein the first flow circuit opening and the second flow circuit opening are coaxial.

10. The device of claim 9, wherein the elongate portion defines a cylindrical shape with an inner wall to separate the first flow circuit opening and the second flow circuit opening.

11. The device of claim 10, wherein the inner wall includes a reducing rectangular cross-section to form a tapered shape.

12. The device of claim 1, further comprising one or more walls disposed between the second housing and the first housing to cause the flow in the first flow circuit to move radially outward and inward as the flow traverses a circumferential path between the first flow circuit opening and the second flow circuit opening.

13. The device of claim 12, wherein the one or more walls define a labyrinth path.

14. The device of claim 13, wherein there are two separate first flow circuits defined between the second housing and the first housing such that each first flow circuit only traverses a portion of circumference of the second housing.

15. A fuel degassing arrangement, comprising:
    a first housing;
    a second housing positioned at least partially radially of the first housing defining an annular space therebetween, an inlet and an outlet being defined in at least one of the first housing and the second housing configured to cause fluid flowing into the annular space to flow circumferentially through a portion of the annular space before exiting the annular space through the outlet; and
    a plurality of tubes positioned within the annular space having walls configured to be selectively permeable to at least one gas such that the at least one gas is able to flow through the walls thereby being separated from fluid passing radially through the annular space, wherein at least one of the first housing or the second housing includes a conical wall configured to distribute flow of fluid between the first housing and the second housing more evenly in an axial direction than would be distributed if the conical wall were not present.

16. The arrangement of claim 15, wherein a circumferential flow of fluid through the annular space is through a circumferential angle of at least 270 degrees.

17. A fluid degassing device, comprising:
a first housing;
a second housing disposed within the first housing;
a first flow circuit defined by the second housing and the first housing between a first flow circuit opening and a second flow circuit opening of the first flow circuit; and
a tube bundle of selectively permeable membrane tubes disposed in the first flow circuit between the second housing and first housing,
wherein the tube bundle is disposed at least partially around a circumference of the second housing and the first flow circuit is defined between the first flow circuit opening of the first flow circuit and the second flow circuit opening such that fuel flows rotationally around the second housing through the tube bundle;
wherein the tube bundle is configured to be in fluid communication with a second flow circuit to fluidly communicate with an inner channel of the tubes of the tube bundle, wherein the second flow circuit is partially fluidly isolated from the first flow circuit such that at least one first fluid cannot pass through a wall of one or more tubes, but such that at least one second fluid can pass through the wall of the one or more tubes to remove the first fluid from the second fluid, wherein the second housing defines both the first flow circuit opening and the second flow circuit opening, wherein the first flow circuit opening and the second flow circuit opening are coaxial, wherein the elongate portion defines a cylindrical shape with an inner wall to separate the first flow circuit opening and the second flow circuit opening, wherein the inner wall includes a reducing rectangular cross-section to form a tapered shape.

18. A fluid degassing device, comprising:
a first housing;
a second housing disposed within the first housing;
a first flow circuit defined by the second housing and the first housing between a first flow circuit opening and a second flow circuit opening of the first flow circuit; and
a tube bundle of selectively permeable membrane tubes disposed in the first flow circuit between the second housing and first housing,
wherein the tube bundle is disposed at least partially around a circumference of the second housing and the first flow circuit is defined between the first flow circuit opening of the first flow circuit and the second flow circuit opening such that fuel flows rotationally around the second housing through the tube bundle;
wherein the tube bundle is configured to be in fluid communication with a second flow circuit to fluidly communicate with an inner channel of the tubes of the tube bundle, wherein the second flow circuit is partially fluidly isolated from the first flow circuit such that at least one first fluid cannot pass through a wall of one or more tubes, but such that at least one second fluid can pass through the wall of the one or more tubes to remove the first fluid from the second fluid, further comprising one or more walls disposed between the second housing and the first housing to cause the flow in the first flow circuit to move radially outward and inward as the flow traverses a circumferential path between the first flow circuit opening and the second flow circuit opening.

19. A fuel degassing arrangement, comprising:
a first housing;
a second housing positioned at least partially radially of the first housing defining an annular space therebetween, an inlet and an outlet being defined in at least one of the first housing and the second housing configured to cause fluid flowing into the annular space to flow circumferentially through a portion of the annular space before exiting the annular space through the outlet; and
a plurality of tubes positioned within the annular space having walls configured to be selectively permeable to at least one gas such that the at least one gas is able to flow through the walls thereby being separated from fluid passing radially through the annular space, wherein a circumferential flow of fluid through the annular space is through a circumferential angle of at least 270 degrees.

* * * * *